(12) United States Patent
Chen et al.

(10) Patent No.: US 10,950,262 B2
(45) Date of Patent: Mar. 16, 2021

(54) MAGNETIC READER SENSOR WITH SHIELD-TO-SHIELD SPACING IMPROVEMENT AND BETTER FREE LAYER-TO-SHIELD SPACING CONTROL

(71) Applicant: Headway Technologies, Inc., Milpitas, CA (US)

(72) Inventors: Wenyu Chen, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/894,932

(22) Filed: Jun. 8, 2020

(65) Prior Publication Data
US 2020/0302957 A1 Sep. 24, 2020

Related U.S. Application Data

(62) Division of application No. 16/405,062, filed on May 7, 2019, now Pat. No. 10,714,130, which is a division of application No. 15/798,682, filed on Oct. 31, 2017, now Pat. No. 10,283,148.

(51) Int. Cl.
*G11B 5/39* (2006.01)
*G11B 5/31* (2006.01)

(52) U.S. Cl.
CPC .......... *G11B 5/3912* (2013.01); *G11B 5/3163* (2013.01); *G11B 5/398* (2013.01); *G11B 5/3932* (2013.01)

(58) Field of Classification Search
None
See application file for complete search history.

(56) References Cited

U.S. PATENT DOCUMENTS

| | | | |
|---|---|---|---|
| 7,839,605 B2 | 11/2010 | Parker | |
| 7,952,839 B2 | 5/2011 | Yamazaki et al. | |
| 8,675,318 B1 | 3/2014 | Ho | |
| 9,041,391 B2 | 5/2015 | Gao et al. | |
| 9,042,062 B2 | 5/2015 | Hong | |
| 9,065,043 B1 | 6/2015 | Xiao | |
| 9,123,886 B2 | 9/2015 | Zhang et al. | |
| 9,286,921 B1 | 3/2016 | Sapozhnikov et al. | |

(Continued)

OTHER PUBLICATIONS

U.S. Notice of Allowance, U.S. Appl. No. 15/345,813, First Named Inventor: Ruhang Ding, dated Jun. 19, 2017, 11 pages.

*Primary Examiner* — William J Klimowicz
(74) *Attorney, Agent, or Firm* — Saile Ackerman LLC; Stephen B. Ackerman

(57) ABSTRACT

An MTJ or MR read sensor is formed by depositing a stack in a reverse order with a free layer (FL) deposited on a lower shield, followed by a tunneling barrier layer (for an MTJ) or a conducting spacer layer (for an MR) and, finally, an antiferromagnetically coupled pinning structure and an upper shield. This reverse order permits a series of etching processes to be accurately performed on the lower shield and the stack together with the formation of biasing layers that are coupled to the lower shield and the stack, without adversely affecting the stability of the pinning structure. Further, the distance between the FL and the shield is accurately determined and repeatable even down to the sub-nm regime. An upper shield can then be formed and also coupled to the biasing layers.

10 Claims, 8 Drawing Sheets

(56) References Cited

U.S. PATENT DOCUMENTS

| | | | |
|---|---|---|---|
| 9,305,578 B1 | 4/2016 | Singleton et al. | |
| 9,355,700 B2 | 5/2016 | Sun et al. | |
| 9,412,400 B2 | 8/2016 | Xiao | |
| 9,437,225 B2 | 9/2016 | Quan et al. | |
| 9,514,771 B2 | 12/2016 | Makino | |
| 9,799,257 B2 | 10/2017 | Ding et al. | |
| 9,799,357 B1 * | 10/2017 | Ding | G11B 5/398 |
| 10,283,148 B1 | 5/2019 | Chen et al. | |
| 10,714,130 B2 | 7/2020 | Chen et al. | |
| 10,714,131 B1 * | 7/2020 | Wu | G11B 5/3909 |
| 2005/0243475 A1 | 11/2005 | Heim | |
| 2015/0221328 A1 | 8/2015 | Le et al. | |
| 2016/0035378 A1 * | 2/2016 | Quan | G11B 5/127 |
| | | | 428/811.2 |
| 2016/0196840 A1 | 7/2016 | Singleton | |

* cited by examiner

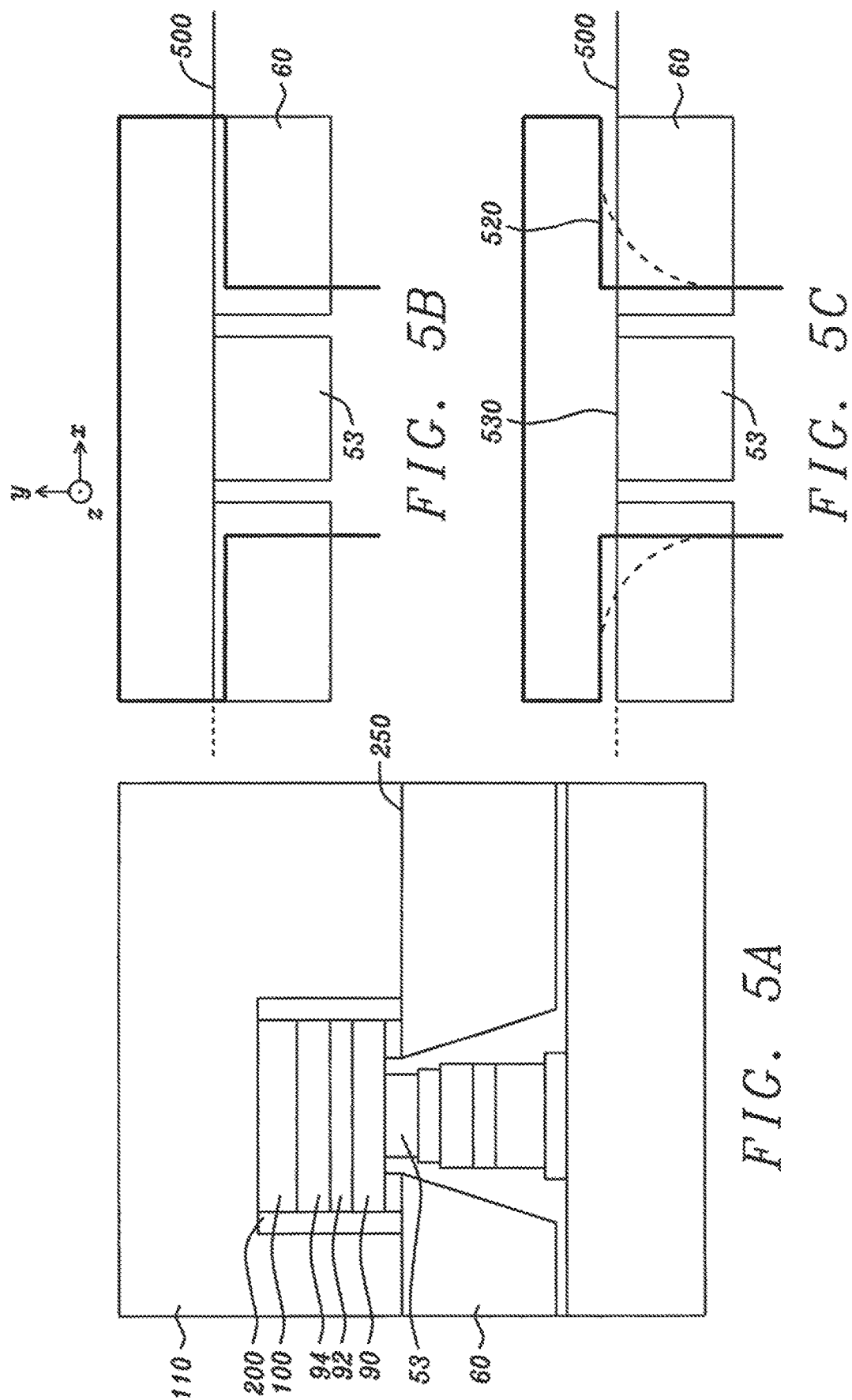

MAGNETIC READER SENSOR WITH SHIELD-TO-SHIELD SPACING IMPROVEMENT AND BETTER FREE LAYER-TO-SHIELD SPACING CONTROL

This is a Divisional Application of U.S. patent application Ser. No. 16/405,062, filed on May 7, 2019, which is a Divisional application of U.S. patent application Ser. No. 15/798,682 filed on Oct. 31, 2017, now issued as U.S. Pat. No. 10,283,148, both of which are herein incorporated by reference in their entirety and assigned to a common assignee

RELATED PATENT APPLICATION

This application is related to US Docket No. HT16-008, Ser. No. 15/345,813 Filing Date: Nov. 9, 2016, assigned to the same assignee.

BACKGROUND

1. Technical Field

This disclosure relates generally to hard disk drives and particularly to methods for improving the resolution of MR sensors used to read magnetic recording media.

2. Description of the Related Art

Current HDD (Hard Disk Drive) designs necessitate the improvement of MR sensor resolution to meet the requirements of increasingly improving areal density capability of magnetic recording media. One direct method of providing this improvement is to reduce shield-to-shield spacing of the sensor. This approach to improving resolution can be found in the prior arts such as US Published Patent Application 2016/0035378 (Quan et al.), Ser. No. 15/345,813, Filing Date: Nov. 9, 2016, U.S. Pat. No. 7,839,605 (Parker) and U.S. Pat. No. 9,355,700 (Sun et al) and U.S. Patent Application 2005/0243475 (Heim).

Some of these prior arts require that pin and antiferromagnetic (AFM) layers be recessed away from the ABS so that the shield to shield spacing becomes smaller. These approaches involve quite complicated additional photo-lithography, etching and refill steps. In addition, alignment between a recessed pin layer and the sensor back edge is also critical in determining the sensor performance and reliability.

Reducing the spacing between the free layer (FL) and the closest shield is another approach to improve resolution. This spacing is normally between the FL and the top shield, and the spacing is determined by process steps such as the sensor cross-track etching, refill, and treatments on top of the sensors. This approach results in large device-to-device and wafer-to-wafer variations in spacer thickness. As a result, sensor resolution is not consistent among wafers with similar thin FL cap designs.

This disclosure presents designs that can control the FL-to-shield spacing quite well, even down to a sub-nm regime, and it simplifies the process steps that characterize much of the prior art cited above.

SUMMARY

A first object of the present disclosure is to improve the resolution of a MR sensor by providing better control and uniformity of the spacing between the magnetic free layer (FL) and the closest shield.

A second object of the present disclosure is to meet the first object while also providing better shielding than is currently found in the prior art.

A third object of the present disclosure is to satisfy the above objects while requiring simplified process steps in recessing pinned and antiferromagnetic (AFM) layers.

A fourth object of the present disclosure is to provide a device with improved stability of antiferromagnetically coupled pinning layers.

A sixth object of the present disclosure is to provide a device having improved stability of soft biasing layers.

A seventh object of this disclosure is to provide a method of reducing dimensional variations on a device-by-device basis resulting from etching processes.

An eighth object of this disclosure is to provide a more efficient and effective process flow by virtue of the minimization of process steps.

The above objects will be met by a design and fabrication process for an MR reader (read sensor) that is based on a reversed film stack shown in FIG. 1(a). Unlike the usual reader film stack, the FL is deposited prior to the MgO tunnel barrier layer and pin stack.

Referring to FIG. 1(a), there is shown schematically the following sequentially layered sensor design. On top of bottom shield S1, 10, which is typically NiFe, 1-2 microns thick in the z-direction, 10-30 microns wide in the x-direction and 5-20 microns tall in the y-direction. On the shield is first deposited a bottom spacer layer 20. This is followed by deposition of the free layer (FL) 30, then the tunnel barrier layer 40 (or a metallic spacer if we have a GMR sensor instead of a MTJ sensor) which is typically MgO, and then a pin layer stack 50 on top, typically two magnetic layers (AP1 51 and AP2 53) aligned with anti-parallel coupling between each other by means of a Ru layer 52 inserted in between. In this way, the spacing between the FL 30 and the closest shield, which is now S1 10, is defined by the layer thicknesses of the intervening layers to produce a film deposition which is normally uniform and repeatable, even down to the sub-nm regime.

BRIEF DESCRIPTION OF THE DRAWINGS

FIG. 5a-5c schematically illustrate further design variations of the previous designs.

DETAILED DESCRIPTION

Figure 1A:
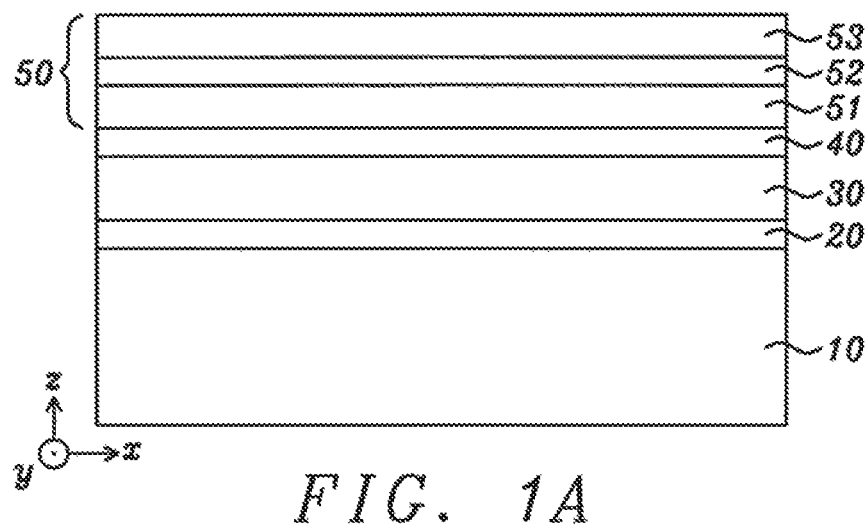
FIGS. 1a-1d schematically show the process steps in the formation of the present MR reader with controlled FL-to-shield spacing.
Figure 1B:
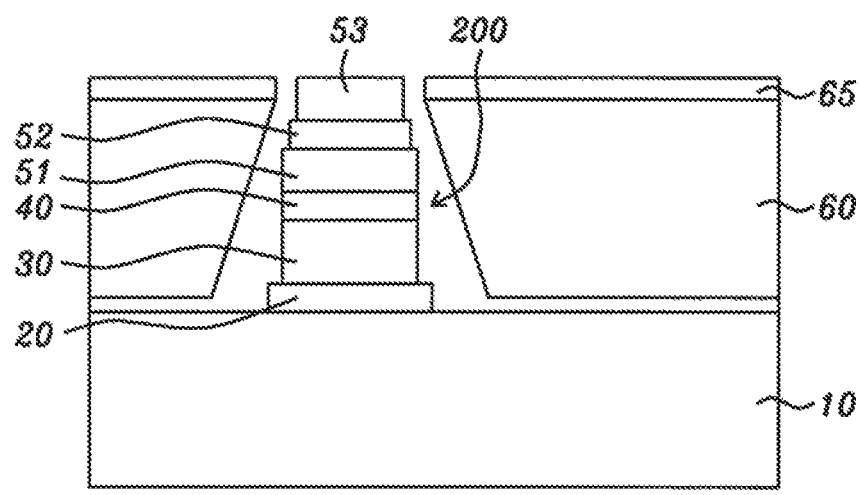

We continue the description of the fabrication process as begun above with the description of FIG. 1(a). After the film stack is deposited according to FIG. 1(a), we do a cross-track (x-directional) etching of the deposited stack first and refill the removed regions with biasing layers 60 abutting the patterned sides 200 of the stack as is schematically shown in FIG. 1(b). The biasing layer is typically a soft magnetic layer such as NiFe with or without CoFe laminated in, or a hard magnetic layer as mentioned in FIG. 4-6. An insulating layer 65 is deposited on biasing layer 60. Layer 65 will prevent subsequent magnetic layers from having direct contact with layer 60 and it is formed of a non-magnetic metal such as Ta, Ru, Cu (which will be shown later in FIGS. 5 and 6, or a non-conducting oxide such as AlOx, $SiO_2$, or MgO, which will be shown in FIG. 4, to prevent shorting). Note that in the following descriptions we will use soft magnetic material (low coercivity) as the biasing layers, but we will also have device variations where hard bias (high coercivity) layers are used.

Figure 1C:
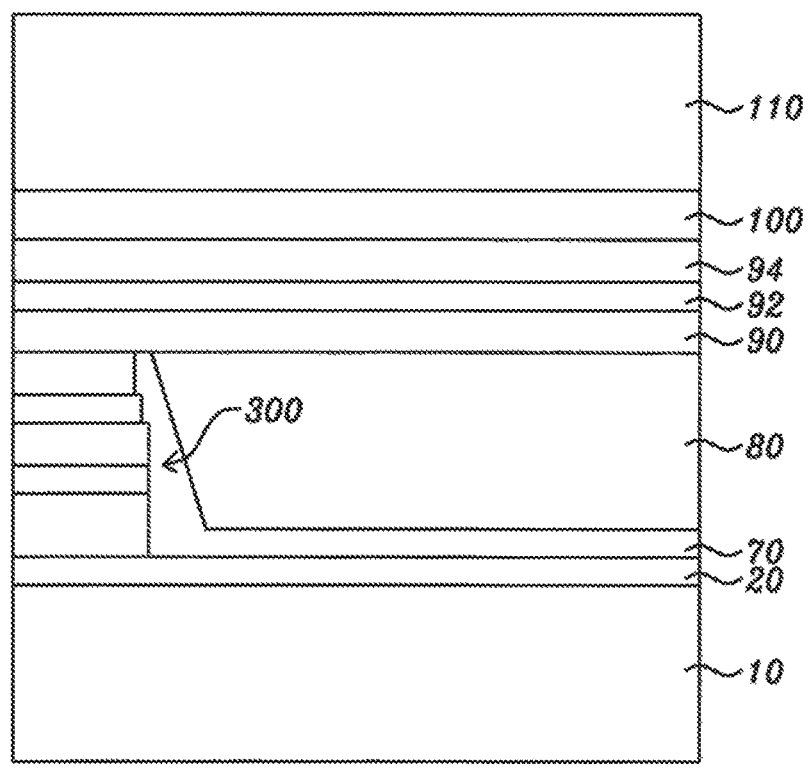

Referring to FIG. 1(c), there is shown the sensor of FIG. 1(b) in a side (y-z plane) cross-sectional view through the center of the fabrication, showing the result of a stripe-height (SH) (y-direction) etching to define the back edge 300 of the sensor. After the SH direction etching, we refill the back edge with an insulating layer 70 first and then an anti-ferromagnetic (AFM) coupling layer 80, which is typically IrMn or PtMn. It is necessary that after the refill, the sensor top from AP2 to back edge AFM layer top should be quite flat and smooth (co-planar).

After photoresist is removed, we deposit more films, typically another two magnetic layers (AP22 90 and AP3 94) with anti-parallel coupling between them by means of the Ru layer 92 sandwiched between them. Then, after an AFM anneal, AP22 90 is coupled to the AFM layer 80 at the back edge of the stack, and through AP22 90 and AP3 94, pinning is also propagated to AP2 53 and AP1 51. Then we deposit the top spacer 100 and top shield (S2) 110. The top shield is typically 40-80 nm thick NiFe with or without CoFe laminated in. The cross-section (y-z plane) view and ABS (x-z plane) view schematics are shown in FIGS. 1(c) and (d) respectively.

Figure 2A:
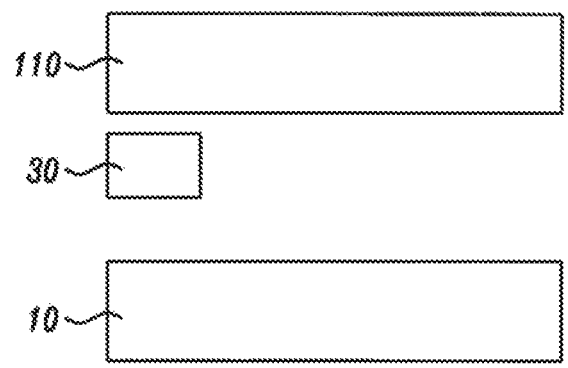
FIG. 2a-2c schematically describes shielding schemes of different readers in cross-sectional views.
Figure 2B:
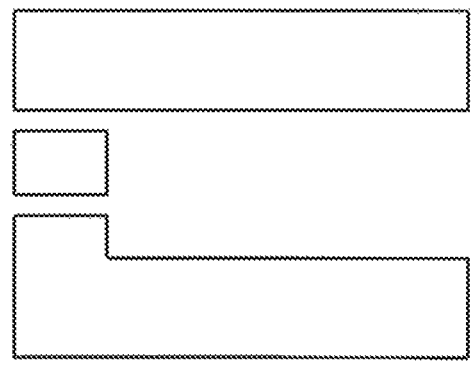
Figure 2C:
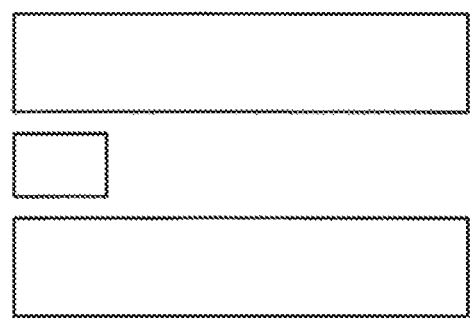

FIG. 2(a)-2(c) schematically shows the shielding schemes of three MR readers with different designs, from the cross-sectional y-z plane view. The small central rectangle 30 schematically represents the FL, and the two rectangles 110 and 10 above and below 30 are the top and bottom shields. FIG. 2(a) is a conventional prior art reader. FIG. 2(b) shows the high-resolution designs of prior art Refs. US 2016/0035378 and Headway docket number HT16-008, where shield-to-shield spacing is effectively reduced only around the sensor regime. FIG. 2(c) is the design of the current invention, with shield to shield spacing improved both around the sensor regime and at the back edge.

Figure 3A:
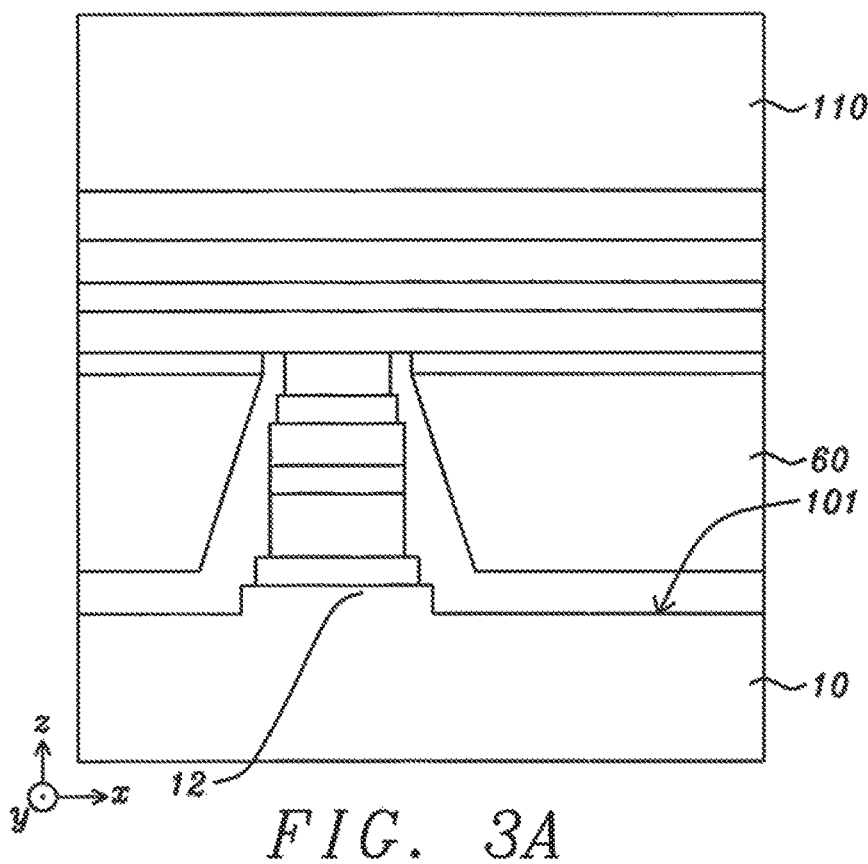
FIG. 3a-3b schematically describes further benefits of the present design.
Figure 3B:
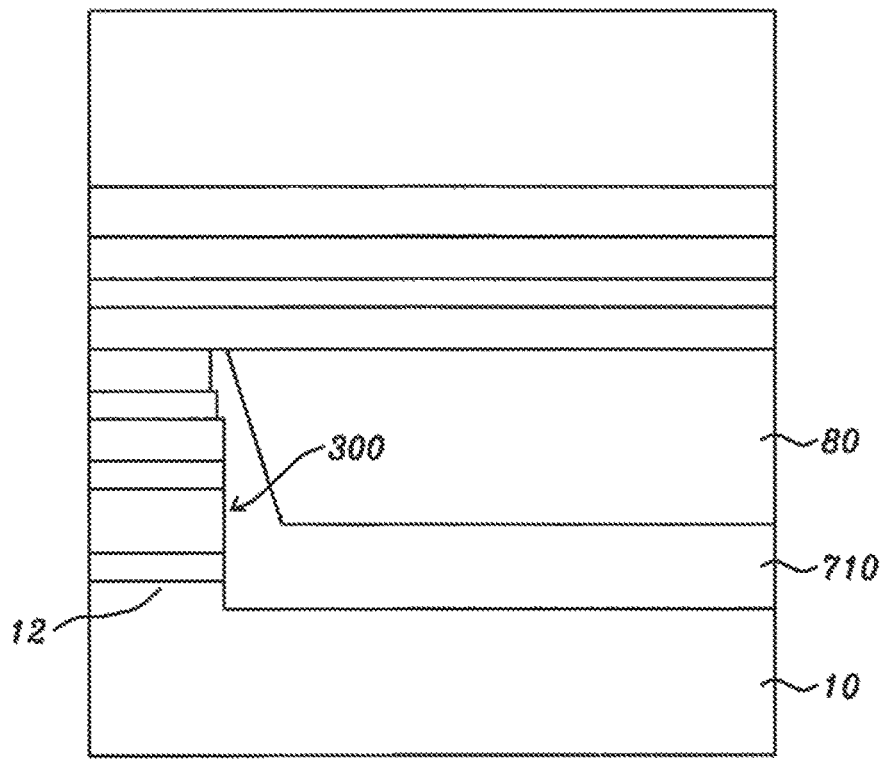

Referring next to FIG. 3(a)-3(b), there is shown two other benefits from the present approach. In the cross-track (x-direction) etching shown in FIG. 3(a), we can etch slightly deeper (in the z-direction) 101 into bottom shield S1, 10, to improve the micro track sharpness (signal profile across the track). However, this is not a good option with a conventional film stack, since deeper etching in a conventional stack also damages pin layers so that pin robustness becomes worse.

In the stripe height definition etching (y-direction), we can also etch more deeply into the S1 10 to reduce the presence of FL tails, as shown by the sharply etched back surface 300 in FIG. 3(b). By this process a pedestal 12 is formed in S1 and a thicker layer of insulation 710 is added. In a conventional method, stripe height etching would stop on top of the pin layers, and due to device-to-device variations, many heads would have an un-etched tail left at the back edge. This would be one of the reasons for poor sensor performance. Further, if we etch too deeply into the pinning layers, pin robustness also becomes worse. The present method does not have these concerns.

Figure 4:
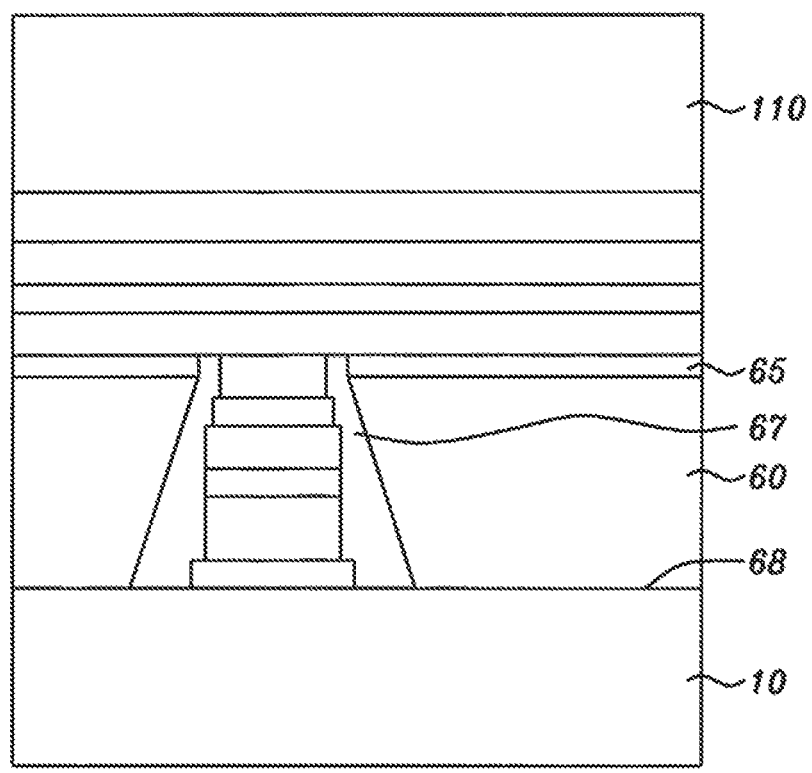
FIG. 4 is a schematic illustration showing in greater detail how biasing layers are made for the present design.

The basic structure and main benefits have been described in the previous paragraph, and here we focus more on the how to form the biasing layer. One option, shown in FIG. 4, is to couple the soft bias layer 60, to S1 10. In this design, after cross track direction etching and insulating layer 65 deposition on top of the bias layer and between the junction side wall of the biasing layer and the sides of the sensor 67, there should be another step of removing the insulating layer 68 at the flat surface on top of S1 while keeping insulator on the junction side wall 67. This allows the soft biasing layer to be coupled to S1 by contact, but prevents the junction from shorting to the biasing layer because of the intervening insulation 67. Then, after the biasing layer deposition, the insulating layer 65 is deposited on its top surface to prevent shorting of the biasing layer with the AP layer stack 90, 92 and 94.

If we do not want to couple the biasing layer 60 directly to the bottom shield 10 as in FIG. 4, we can now include coupling of the soft bias layer 60 to the top shield S2 110 in the design and fabrication process. Part of the AP22/coupling layer/AP3/top spacer (90/92/94/100) now above the soft bias layer, must be etched away and S2 110 added directly on top so that it can contact the soft biasing layers 60. This arrangement is shown in FIG. 5(a), where S2 now extends down past the two buffer layers 200 abutting etched-away sides of the AP22/coupling layer/AP3/top spacer (90/92/94/100) to contact the soft biasing layers at the interface 250. This approach will require additional photolithography and etching. Creating and aligning the etching photo-mask is a difficult part of this design process. In the cross-track x-direction, the photo-mask must be wider than the width of the sensor stack, yet it cannot be too much wider, because the soft bias layer must have a large enough area for effective coupling to S2. There are several options for aligning this layer in the vertical direction, and the boundaries with light and dark lines are shown in top view (x-y plane) schematics of FIGS. 5(b) and 5(c). Note that the dark lines are the actual edges of the sensor and the biasing layers, the light lines show the edges of the pattern to be used for the etching process.

FIG. 5(b) illustrates an option where the vertical (y-direction) boundary of this etching step is below (i.e., closer to the ABS plane) the sensor back edge. The advantage of this option is the stronger coupling in AP22/AP3 90/94. In the present reversed stack design, coupling weakness of AP22/AP3 can be found along the FL back edge, where the uneven surface of the back-edge refill, called the "refill stitch" 500, is located. With this option, the coupling width of AP22/AP3 over the stitch is wider, and there will be a reduced chance of pin flip. The difficulty is that there is not much room for this boundary to shift in the vertical (y) direction. If the boundary is too low, the area that remains to couple the soft bias layers to S2 110 is too small, so that instabilities may occur in the soft bias.

The second option is to have the vertical boundary 520 above the sensor back edge 530, as shown in FIG. 5(c). In this case we will have enough area for effective coupling of the soft bias layers to S2, but the coupling width of AP22/AP3 is smaller, and we have some areas where AP2 is directly coupled to S2 on the side. But the impact of this directly coupled region to the sensor should be small since it is quite far from the sensor. To balance these two effects, we can create the flare-out shape of this layer shown with the lighter dashed lines in FIG. 5(c), so that the AP22/AP3 coupling width is larger without losing as much soft bias to the S2 coupling area.

Figure 1D:
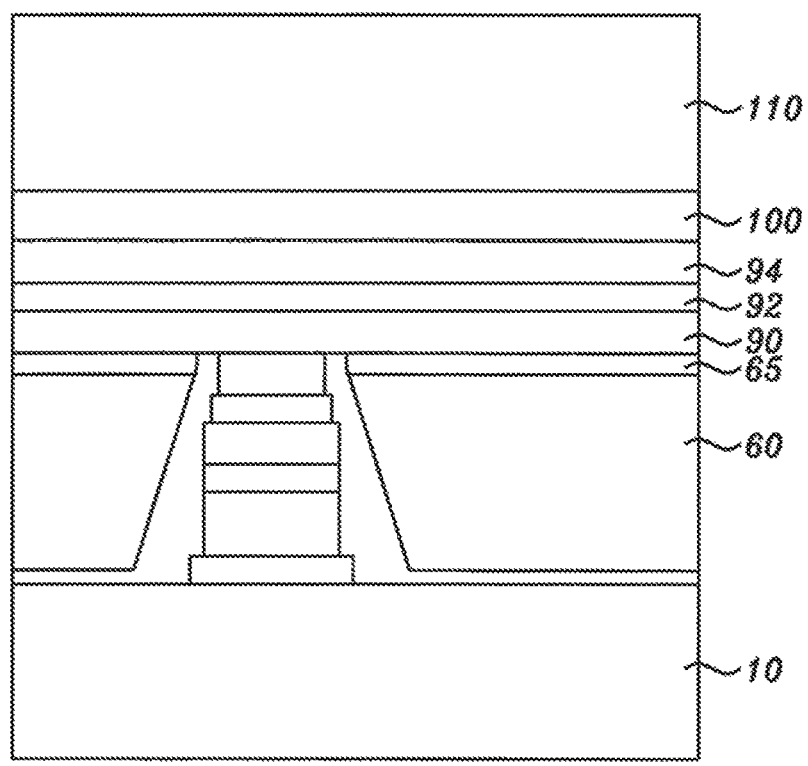
Figure 6A:
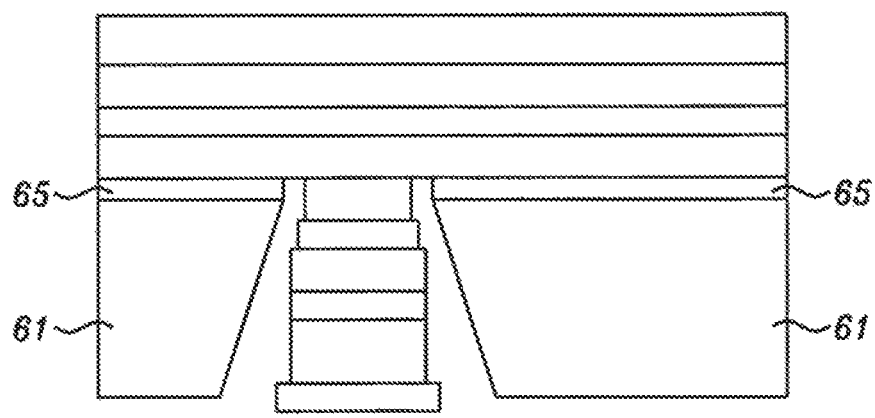
FIG. 6a-6c are schematic illustrations showing the formation of different types of biasing layers involving combinations of hard and soft bias.

The present method also allows several ways to construct a hard biasing layer. FIG. 6(a) illustrates a particularly straightforward way which to do this, which is to deposit a layer 61 with very high coercivity (typically CoPt or FePt) in place of the soft biasing layer of FIG. 1(d). This can be done using the same design as in FIG. 1(d). This approach is now shown in FIG. 6(a), where, for simplicity, upper and lower shield layers are not shown and only the bias layers 60 and an insulating layer 65 are identified by number because all other layers are exactly as shown in FIG. 1(d) with exception of the lower and upper shields. However, it has been shown that when using the present design, the soft biasing layer (typically NiFe) has better on-track performance as well as cross track sharpness, although the soft biasing layer needs to be pinned by some other layer whose magnetization cannot be easily re-oriented.

Figure 6B:
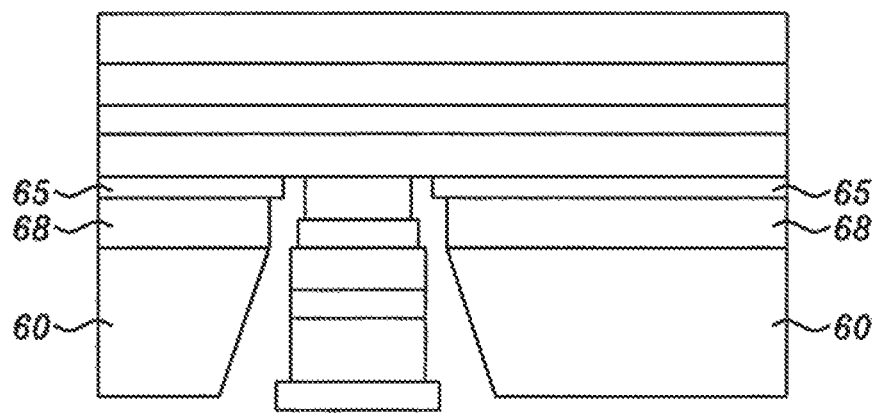

Another way to introduce hard magnetic bias layers is to couple the NiFe soft magnetic bias layer 60 to a CoPt or FePt hard bias layer 66, as shown in FIG. 6(b). Note that the hard bias layer here no longer provides a biasing field and, therefore, it only needs a high coercivity. It is not necessary that it has a large enough moment to provide the field. As in FIG. 6(a), only the biasing layers are numbered for reference.

Figure 6C:
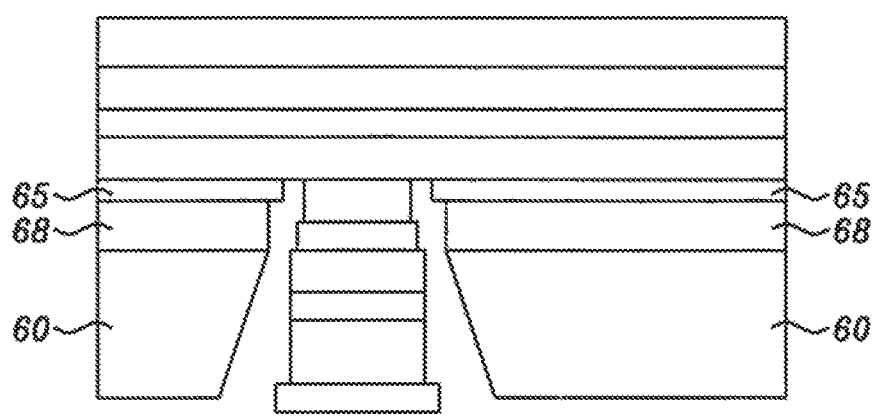

Another possibility is to couple the soft biasing layer to an additional AFM layer 68, as shown in FIG. 6(c). But care must be taken with respect to its thickness and properties. When the pin layer's AFM at the back edge (see 80, in FIG. 1(c)) is being annealed, the biasing layer AFM 68 has already been deposited. Therefore the AFM biasing layer should be thin enough to be re-oriented at a later anneal, with the temperature below the blocking temperature of the pin layer, and it also should not be too thin so as to cause concern over its thermal robustness.

Figure 7A:
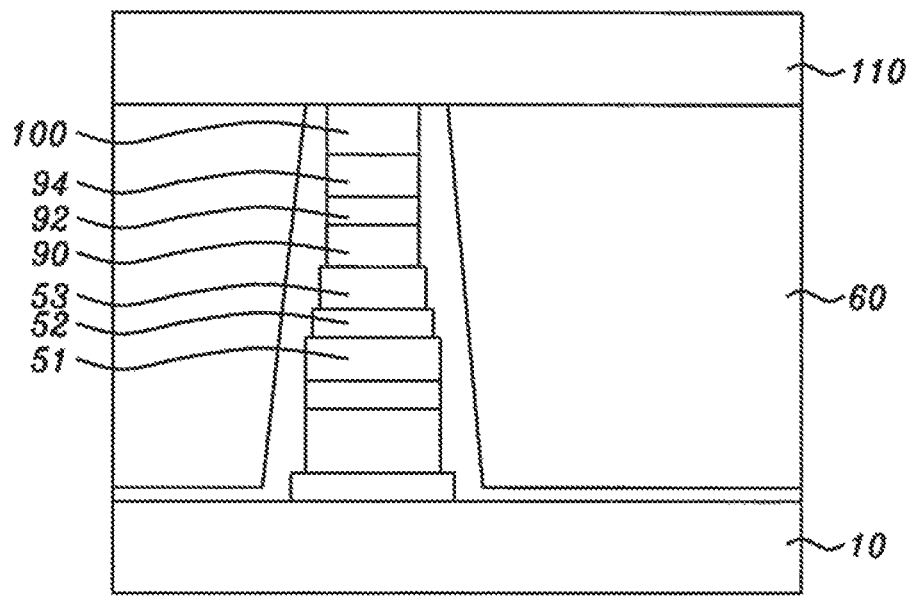
FIG. 7a-7b are schematic illustrations showing the effects of different etching processes on producing variations in biasing structures.
Figure 7B:
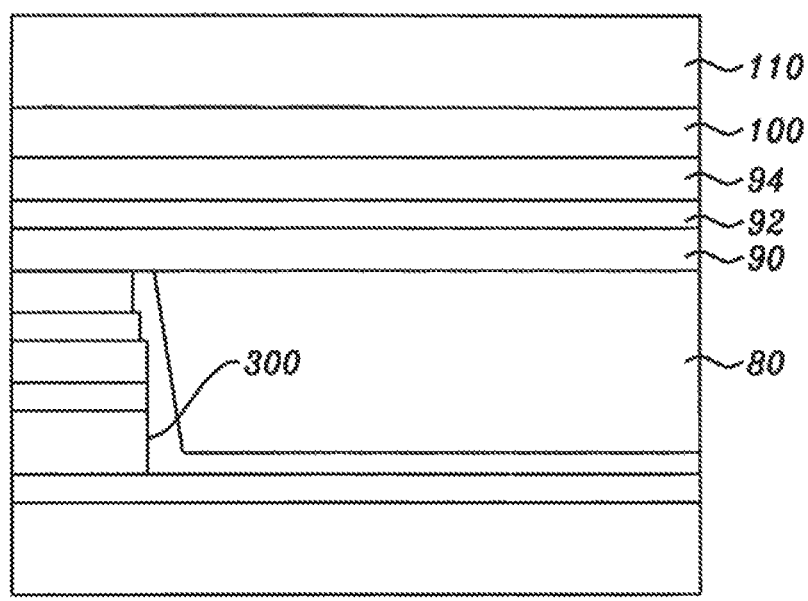

Referring now to FIGS. 7(a) and 7(b) there are shown two views of the results of doing stripe height etching before the cross-track etching. Using this process option, as shown in 7(a), a soft biasing layer 60 can be coupled directly to top shield S2 because the AP22/coupling/AP3/spacer layers have been etched away laterally and do not intervene between the top shield 110 and the bias layers 60. As shown in 7(b), the stripe-height (y) direction has been done first, and the rear of the device 300 is trimmed. Hard magnetic bias is also possible with this process flow. Note also that the combined pinning stack of AP1/Ru/AP2/AP22/Ru/AP3, 51/52/53/90/92/94, (using Ru for the coupling layer), is to use antiparallel orientations of the ferromagnetic layers to cancel the presence of a dipolar field from a net magnetic moment at the position of the FL. If this is not required, other schemes of the AP stack are possible.

As is finally understood by a person skilled in the art, the detailed description given above is illustrative of the present disclosure rather than limiting of the present disclosure. Revisions and modifications may be made to methods, materials, structures and dimensions employed in forming and providing a shielded MTJ or MR read sensor with improved resolution resulting from more precise shield-to-free layer spacing, while still forming and providing such a structure in accord with the spirit and scope of the present invention as defined by the appended claims.

What is claimed is:

1. A method of forming an MTJ or MR read sensor, comprising:

providing a bottom shield layer;

sequentially forming on said bottom shield layer a reversed thin-film MTJ or MR sensor stack deposition, wherein a spacer layer is formed on said bottom shield layer, a free layer (FL) is formed on said spacer layer, a barrier layer (for an MTJ) or conducting layer (for an MR) is then formed on the FL and a pinned layer structure is formed thereon; then patterning said sensor stack deposition in a cross-track (x) direction to remove laterally extending portions of each layer formed sequentially on said bottom shield layer and to reduce the stack width and produce symmetrically sloping sides; then forming a pedestal in said bottom shield layer by the removal of an upper surface portion of said bottom shield layer, wherein said removed upper surface portion extends to the rear of and to both sides of said patterned spacer layer, whereby said pedestal is beneath said patterned deposition and is co-planar with the rear and extends slightly, but symmetrically to either side;

forming a first layer of insulation to fill a space formed by said removal of said upper surface layer of said bottom shield layer, said insulation layer covering said rear and both sides of said patterned deposition and having planar sloping sides thereon;

forming biasing layers over said layer of insulation, said biasing layers abutting said planar sloping sides of said first layer of insulation and said biasing layers having a planar upper surface; then forming a second layer of insulation over said biasing layers; then patterning a back end of said sensor stack deposition in a stripe-height (y) direction, reducing the height of all layers thereof and producing a sloping side thereon; then forming a refill layer of insulation on a bottom spacer layer, said refill layer extending to and conformally abutting said sloping side of said sensor stack; then forming an antiferromagnetic (AFM) coupling layer on said refill layer of insulation, said coupling layer extending to and abutting said sloping side of said refill layer of insulation; and forming a smooth surface in which a top surface of said AFM coupling layer and said pinned layer structure are co-planar.

2. The method of claim 1 wherein said pinned layer structure comprises an upper ferromagnetic layer AP2, a lower ferromagnetic layer AP1 and a coupling layer inserted between AP2 and AP1 whereby AP2 and AP1 are magnetically coupled in antiparallel directions.

3. The method of claim 1 further comprising:

forming, on said smooth top surface, a pair of magnetic layers comprising a top layer and a bottom layer coupled in an antiparallel configuration by means of a coupling layer formed between them; then forming a spacer layer on an upper surface of said top layer;

forming an upper shield layer on said spacer layer.

4. The method of claim 3 further comprising:

patterning said coupled pair of magnetic layers and said spacer layers above and beneath them to uniformly reduce the width and height of all said layers so that said layers extend symmetrically in the x and y directions further than the corresponding extent of said FL and produce a layered rectangular prism having a planar top surface, an ABS surface, a rear surface and two parallel side surfaces; then forming said upper shield layer to partially surround said layered rectangular prism whereby said upper shield layer covers the top surface, the rear surface and both side surfaces of said rectangular prism while leaving said ABS surface uncovered and wherein said surrounding portion of said upper shield layer extends downward to contact an upper surface of said biasing layers thereby coupling to said biasing layers and stabilizing them.

5. The method of claim 4 wherein said biasing layers are layers of soft magnetic material.

6. The method of claim 4 wherein said biasing layers are layers of hard magnetic material.

7. The method of claim 3 wherein said biasing layers are layers of soft magnetic material on each of which is formed a layer of hard magnetic material.

8. The method of claim 3 wherein said biasing layers are layers of soft magnetic material on each of which is formed a layer of antiferromagnetic material.

9. The method of claim 8 wherein said layer of antiferromagnetic material is of such material and of such dimensions that its magnetization is re-oriented subsequent to an anneal.

10. The method of claim 9 further comprising:
patterning said pair of magnetic layers comprising said top layer and said bottom layer coupled in an antiparallel configuration by means of said coupling layer formed between them; then forming said spacer layer on an upper surface of said top layer; and forming said upper shield layer on said spacer layer.

* * * * *